(12) United States Patent
Landergan et al.

(10) Patent No.: US 12,253,856 B2
(45) Date of Patent: Mar. 18, 2025

(54) MOBILE ROBOT CLEARANCE SYSTEMS

(71) Applicant: OMRON Corporation, Kyoto (JP)

(72) Inventors: Mark Landergan, San Jose, CA (US); Thomas Fisher, North Logan, UT (US)

(73) Assignee: OMRON Corporation, Kyoto (JP)

( * ) Notice: Subject to any disclaimer, the term of this patent is extended or adjusted under 35 U.S.C. 154(b) by 290 days.

(21) Appl. No.: 18/060,485

(22) Filed: Nov. 30, 2022

(65) Prior Publication Data

US 2024/0176351 A1 May 30, 2024

(51) Int. Cl.
*G05D 1/02* (2020.01)
*G05D 1/00* (2006.01)

(52) U.S. Cl.
CPC ......... *G05D 1/0223* (2013.01); *G05D 1/0066* (2013.01); *G05D 1/0214* (2013.01); *G05D 1/024* (2013.01)

(58) Field of Classification Search
CPC .. G05D 1/0223; G05D 1/0066; G05D 1/0214; G05D 1/024
See application file for complete search history.

(56) References Cited

U.S. PATENT DOCUMENTS

| | | | |
|---|---|---|---|
| 2015/0362921 A1* | 12/2015 | Hanaoka | G05D 1/0274 |
| | | | 702/159 |
| 2018/0268699 A1 | 9/2018 | Ohsawa et al. | |
| 2022/0080966 A1 | 3/2022 | Sadamoto et al. | |

FOREIGN PATENT DOCUMENTS

| | | | | |
|---|---|---|---|---|
| EP | 3617828 A1 * | 3/2020 | | G05D 1/0061 |
| JP | 9-166452 | 6/1997 | | |
| WO | WO 2009/063318 A1 | 5/2009 | | |

OTHER PUBLICATIONS

International Search Report and Written Opinion received in international application No. PCT/JP2023/040721, mailed Jan. 30, 2024, 9 pages.

* cited by examiner

*Primary Examiner* — Calvin Cheung
(74) *Attorney, Agent, or Firm* — Knobbe, Martens, Olson & Bear, LLP (57) ABSTRACT

A mobile robot can have a safety system that is configured to stop the mobile robot when an object is detected inside of a safety zone. The size of the safety zone can change based on the speed of the robot. The robot can predict future safety zones and determine whether objects would be inside of the predicted future safety zones. The robot can change its trajectory, such as by slowing down, so that the actual safety zone of the robot avoids the object. Accordingly, the mobile robot can avoid the object without stopping and without triggering the safety system of the robot. The mobile robot is configured to look ahead and predict likely safety events, and then take action to avoid the predicted safety events.

20 Claims, 6 Drawing Sheets

MOBILE ROBOT CLEARANCE SYSTEMS

BACKGROUND

Field of the Disclosure

Some embodiments disclosed herein relate to clearance systems for mobile robots, such as for navigation and/or collision avoidance.

Description of the Related Art

Although safety systems are known for enabling mobile robots to perform an emergency stop, such as to avoid a collision, the emergency stops can cause wear and tear on the robot, can cause instability for the robot, and can cause delay and inefficiency.

SUMMARY OF CERTAIN INVENTIVE ASPECTS

The innovations described herein have several aspects, no single one of which is solely responsible for its desirable attributes. Without limiting the scope of the claims, some features of this disclosure will now be briefly described.

In accordance with one aspect of the disclosure, a mobile robot can include a drive system configured to move the mobile robot, an environmental sensor configured to identify one or more objects in an environment around the mobile robot, and a safety stop system. The safety stop system can be configured to determine a safety zone, and the size of the safety zone can be based at least in part on a velocity of the mobile robot. The safety system can determine whether an object identified by the environmental sensor is in the safety zone, and can engage emergency braking to stop the mobile robot in response to a determination that an object is in the safety zone. The robot can include a safety stop avoidance system, which can be configured to access trajectory information for a planned path of travel for the mobile robot, identify an object that is outside a current safety zone, determine based at least in part on the trajectory information that the object will be inside a predicted future safety zone that would trigger a safety stop event, and control the drive system to slow the mobile robot to reduce the size of the safety zone to avoid the safety stop event.

The safety stop system can be hardware-based, and/or the safety stop avoidance system can be software-based. The size of the safety zone can be based at least in part on a user-adjustable parameter. A size of the predicted future safety zone can be also based at least in part on the user-adjustable parameter. The mobile robot can include a navigation system. The safety stop system, the safety stop avoidance system, and the navigation system can operate in parallel as separate modules. The mobile robot can include a navigation system that is configured to modify the planned trajectory of travel for the mobile robot based at least in part on a notification that the safety stop avoidance system slowed the mobile robot.

In accordance with one aspect of the disclosure, a mobile robot can include a drive system configured to move the mobile robot, a sensor configured to identify one or more objects near the mobile robot, and a safety system configured to stop the mobile robot when an object is detected inside of a safety zone. The size of the safety zone can be based at least in part on a velocity of the mobile robot. The robot can include a clearance system, which can be configured to identify an object using the sensor, access trajectory information for a planned path of travel for the mobile robot, and determine a first future safety zone based at least in part on the trajectory information that includes a first velocity. The first future safety zone can have a first size that corresponds to the first velocity. The clearance system can determine that the object is inside the first future safety zone, and can determine a second future safety zone that has a second size that corresponds to a second velocity, wherein the second size is smaller than the first size so that the object is outside the second future safety zone. The robot can modify the trajectory information to use the second velocity.

The second velocity can be slower than the first velocity. The sensor can include a laser scanner. The clearance system can be configured to determine the first future safety zone to have the same first size that the safety zone has for the first velocity. The safety system and the clearance system can operate in parallel at the same time.

In accordance with one aspect of the disclosure, a mobile robot can include a drive system configured to move the mobile robot. The robot can have an environmental sensor configured to identify one or more objects in an environment near the mobile robot. The robot can have a safety system configured to perform a safety stop when an object is detected inside of an active safety zone of the robot. The robot can have a navigation system, which can be configured to generate trajectory information based on a location, a target location, and one or more objects located in the environment. The trajectory information can includes a route from the location to the target location and one or more velocities along the route. The navigation system can be configured to determine one or more predicted safety zones based on the trajectory information, to determine that an identified object would be inside one of the one or more predicted safety zones, and to adjust the trajectory information to produce modified trajectory information for which the identified object is outside the one or more predicted safety zones.

A size of the safety zone can be based at least in part on a velocity of the mobile robot. The navigation system can be configured to adjust the trajectory information by slowing the velocity of the mobile robot. The navigation system can be configured to adjust the trajectory information by changing a route of the mobile robot. The navigation system can be configured to determine a plurality of predicted safety zones based on the trajectory information, and to compare a location of the object to the plurality of predicted safety zones.

In accordance with one aspect of the disclosure, a robot can include a safety system configured to detect a safety event and take a safety action in response to the detected safety event. The robot can have a clearance system configured to predict a future safety event and take action to avoid the predicted future safety event.

The safety system can be configured to stop the robot when an object is identified inside of a safety zone. The clearance system can be configured to slow the robot when an object is identified outside of the safety zone and inside of a predicted future safety zone. A size of the safety zone and/or a size of the predicted future safety zone can change based at least in part on a speed of the robot. The clearance system can be configured to determine a reduced speed for which the object remains outside the safety zone and to slow the robot to the reduced speed.

BRIEF DESCRIPTION OF THE DRAWINGS

Certain embodiments will be discussed in detail with reference to the following figures, wherein like reference

DETAILED DESCRIPTION OF CERTAIN EMBODIMENTS

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

A mobile robot can include a safety system that is configured to perform an emergency stop when an object is detected inside of the robot's active safety zone. For example, the robot can perform emergency braking when a safety event occurs. The emergency stops can cause wear and tear on the robot, can upset the stability of the platform (e.g., which can cause items carried by the robot to shift or drop), and/or can increase the travel time of the robot and reduce efficiency. In some cases, the safety system can cause the robot to remain stopped for a period of time (e.g., about two seconds) after the robot stops in response to a safety event. After that period of time, the robot can start moving again, but it can be several seconds before the robot is back up to speed. Accordingly, each safety event can cause a delay of several seconds (e.g., about 7 to 10 seconds, although other configurations are possible).

In some embodiments, the robot can have a system for reducing and/or avoiding the occurrence of safety events (e.g., and the associated emergency stops). This can reduce the wear and tear and robot, can improve stability of the robot, and/or can decrease travel times and increase efficiency. The system can predict a future safety event and can modify the trajectory of the mobile robot to avoid the predicted safety event. The system can proactively avoid safety events, whereas the safety system can be reactive to the occurrence of safety events. The system can look further ahead than the safety system and can identify an object that is outside the currently active safety zone and has therefore not yet triggered a safety event. The system can predict that the object will trigger a future safety event if the robot continues along the planned path at the planned speed. The system can then slow the speed of the robot to reduce the size of the safety zone, so that the identified object does not enter the safety zone and does not trigger a safety event. The system can mimic the safety system, but can look further ahead to identify and avoid predicted safety events.

Figure 1:
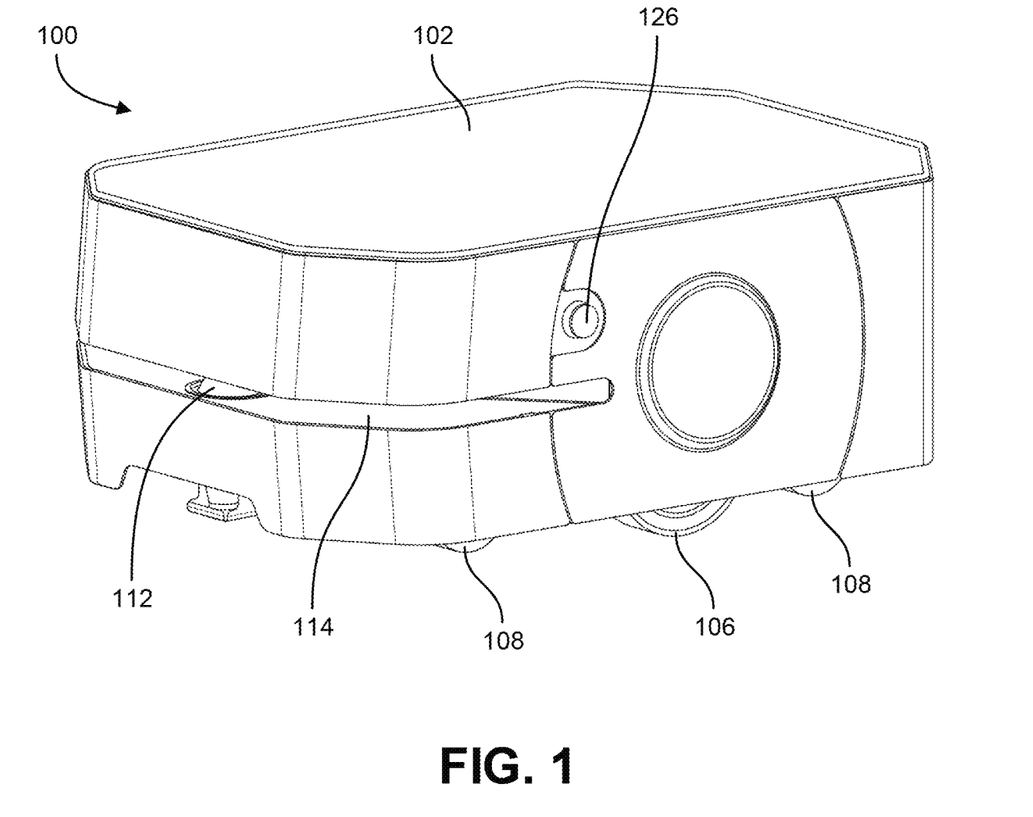
FIG. 1 shows an example embodiment of a mobile robot.
Figure 2:
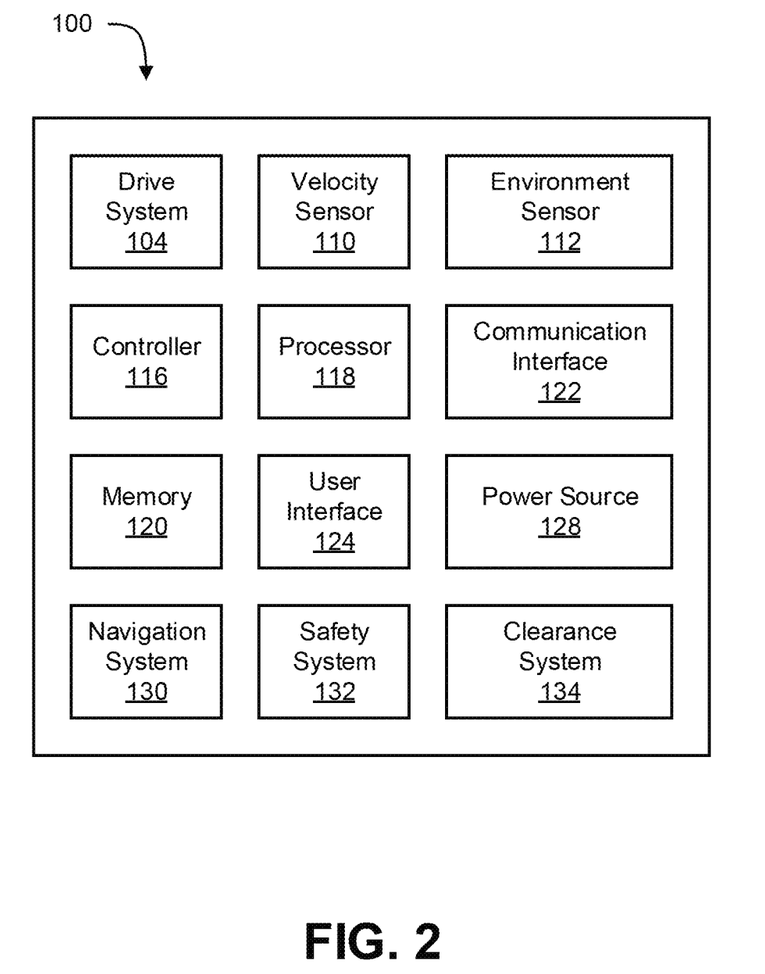
FIG. 2 is a schematic diagram of an example embodiments of a mobile robot.

FIG. 1 shows an example embodiment of a mobile robot 100. FIG. 2 shows a schematic diagram of a mobile robot 100. The mobile robot 100 can have a chassis or housing 102, which can support various other components of the robot 100. Some components can be disposed inside the housing 102, and some components can be at least partially exposed so that they can interact with entities outside the housing 102. The robot 100 can have a drive system 104, which can be configured to move the robot 100. For example, the robot 100 can have one or more driven wheels 106, which can be driven by at least one motor (not visible in FIG. 1). In some embodiments, two or more driven wheels 106 can be independently driven to cause the mobile robot 100 to move forward, move backward, turn, etc. In some embodiments, a steering mechanism (e.g., a pivoting wheel) can turn the robot 100. In some cases, one or more non-driven wheels 108 can provide support to the robot 100. In some embodiments, the drive system 104 can include a braking system (e.g., not visible in FIG. 1), which can be configured to stop the robot 100. For example, disc brakes, or drum brakes, or any suitable type of braking mechanism can be used. In some embodiments, the one or more motors (e.g., electric motor(s)) that drive the driven wheel(s) 106 can be used for braking to slow or stop the robot 100. Various other suitable drive systems can be used, such as tracks or legs.

In some embodiments, the robot 100 can have a velocity sensor which can provide information regarding the speed or velocity of the mobile robot 100. The velocity sensor 110 can measure rotations of a driven wheel, a component of the motor, or other component. In some embodiments, the motor can output velocity information. In some embodiments, the velocity sensor 110 can determine the velocity using GPS, or any other suitable device or manner.

The robot 100 can have an environmental sensor 112, which can be used to sense or measure the environment around the robot 100. The environmental sensor 112 can be a Lidar system, for example. The environmental sensor 112 can include at least one laser, which can emit laser pulses across a range of angles. The environmental sensor 112 include a light detector, which can receive light from the laser pulses that was reflected by the environment (e.g., objects) around the robot 100. The received light can be used to determine the location over objects around the robot 100. For example, the direction of the emitted laser pulse and/or the direction of the received light can indicate the direction of the object, and the timing of the emitted laser pulse and/or the received light (e.g., time-of-flight) can indicate the distance of the object from the robot. The housing 102 of the robot 100 can have an opening 114, such as a generally horizontal slit, to permit light to exit and enter the environmental sensor 112 of the robot 100 (e.g., across a range of angles). Various other types of environmental sensors 112 could be used, such a camera, a video analysis system that analyzes video from a camera on the robot 100 to identify objects or other environmental features, a sonar system, and/or a heat sensor, etc.

The system can include a controller 116, which can operate various aspect of the robot 100. For example, the controller 116 can interpret information from the environmental sensor 112, such as to identify objects, determine distances to or locations of objects, operate the drive system 104, perform navigation and/or collision avoidance operations, perform safety stops or emergency braking, perform actions to avoid safety events as discussed herein, or various other features and functions of the robot 100. The various functions of the robot 100 disclosed herein can be implemented by the controller 116, even where the controller 116 is not specifically discussed.

The robot 100 can include at least one processor 118, which can be a hardware processor. The processor 118 can include circuitry configured to execute operations to implement the various functions and features discussed herein. In some embodiments, the robot 100 can include multiple processors 118, and different tasks can be performed by different processors 118. The robot 100 can include memory 120, which can be computer-readable memory (e.g., non-transitory computer-readable memory). The memory 120 can include RAM, ROM, non-volatile memory, flash memory, a hard disc, or any other suitable type of memory. In some embodiments, the robot 100 can include multiple memory components, which can store different types of information or instructions for different function or features. The memory 120 can include instructions that can be executed by the at least one processor 118 to implement the controller 116 and/or to perform the various functions and features disclosed herein. In some embodiments, the functions and/or features can be implemented by an integrated circuit or other special purpose processor that is specifically configured to perform the functions and features disclosed herein.

In some cases, the controller 116 can include a plurality of control modules. Different tasks or functions can be performed by different control modules (e.g., different processors 118 and/or different sets of software instructions). By way of example, a first or safety control module can be configured to identify safety events and to implement an emergency stop in response to an identified safety event, and a second control module can be configured to predict can avoid safety events, as discussed herein. The first or safety control module can be safety rated, and can undergo more stringent inspections and testing. In some cases, the safety rated module can be monitored during operation, so that a failure or malfunction can be identified and addressed (e.g., by shut down of the robot). In some cases, the first or safety module can be hardware-based (e.g., without a software component), which can facilitate the safety rating of the safety module. In some embodiments, the safety module can have a software module that is relatively simple by comparison to the second module, which can facilitate the safety rating of the safety module. In some cases, the second control module that is configured to predict and avoid safety events is not safety rated, which can enable the second control module to be implemented with software, and/or more complex sets of instructions.

The robot 100 can include a communication interface 122, which can be used to send information from the robot 100 and/or to receive information from an external device. The communication interface 122 can be wireless, such as using WiFi, Bluetooth, or any other suitable wireless communication protocol. In some embodiments, the communication interface 122 can use a wired connection. For example, the communication interface 122 can include a port or a plug, which can be configured to connect to a corresponding plug or port that is coupled to an external device, to enable communication therebetween. For example, a USB port can be used, although various types of port or other wired connections could be used. In some cases, a user can couple a laptop, smartphone, or other computer device to the robot 100 via the communication interface for adjusting parameter of the robot 100, for diagnosing issues with the robot 100, for updating features of the robot 100, etc.

The robot 100 can include a user interface 124, which can be used to receive input from a user and/or to provide output (e.g., information) to a user. The user interface 124 can include one or more buttons 126, switches, dials, or other user input elements, a touchscreen, a display, one or more lights, a speaker, a microphone, etc. In some cases, a user can provide input to adjust parameter of the robot 100, such as parameters of the safety system and/or of the system that is configured to reduce safety events.

The robot 100 can include a power source 128, which can be a battery. The battery can be rechargeable, and the robot 100 can be configured to dock with a recharging station for regarding the battery (e.g., through an electrical interface). The power source 128 can provide electrical power to operate the drive system 104 (e.g., one or more electric motors), the various sensors and controllers and other systems disclosed herein. The power source 128 can provide DC or AC power, and any suitable type of power source 128 could be used.

The robot 100 can include a navigation system 130. The navigation system 130 can be used to determine trajectory information for the robot 100. The navigation system 130 can receive a destination and/or one or more waypoints, such as from the user interface 124 or the communication interface 122. The navigation system 130 can receive environmental information (e.g., object locations) from the environmental sensor 112, and can use that information to determine trajectory information to navigate the robot 100 (e.g., towards a destination). The trajectory information can include a path or route. The trajectory information can include one or more speeds or velocities for the robot (e.g., at one or more portions or locations along the path or route). In some cases, the navigation system 130 can determine intermediate waypoints based on the environmental information. In some embodiments, the navigation system 130 can modify the trajectory information while the robot 100 is moving. For example, if an object moves or a new object is detected (e.g., by the environment sensor 112), the navigation system 130 can determine to change the path or route of the robot 100 and/or can determine to change a speed of the robot 100.

The robot 100 can include a safety system 132, which can determine when a safety event has occurred and can perform an emergency stop in response to a safety event. The safety system 132 will be discussed in connection with FIGS. 3 and 4. The system 132 can determine if an object 140 is inside of the robot's active safety zone 142. The safety zone 142 can have a generally fanned or trapezoidal shape that extends in front of the robot 100 along the robot's direction of travel. The safety zone 142 can widen along a direction extending away from the robot 100. The safety zone 142 can extend forward of the robot 100 by a distance, which can be about 0.5 meters, about 1 meter, about 1.5 meters, about 2 meters, about 2.5 meters, about 3 meters, about 3.5 meters, about 4 meters, or more, or any values or ranges therebetween, although other configurations are possible. The size of the safety zone 142 can vary based on the speed of the robot 100. The safety zone 142 can be larger when the robot 100 is moving at a faster speed, and the safety zone 142 can be smaller when the robot 100 is moving at a slower speed. The safety system 132 can determine the current safety zone 142, such as based on velocity information (e.g., from the velocity sensor 110). The safety system 132 can determine whether any objects are inside of the current safety zone 142. If an object is identified inside of the safety zone 142, the safety system 132 can implement a safety procedure, such as to stop the robot 100. In some configurations, the safety system 132 can identify an object 140, and the safety system 132 can then determine whether the object 140 is located inside the safety zone 142. If the object is inside the safety zone 142, the safety system can trigger a safety procedure, such as to stop the robot 100. The safety system 132 can determine the location of object(s) using the environment sensor 112 (e.g., a Lidar or other laser scanning system).

Figure 3:
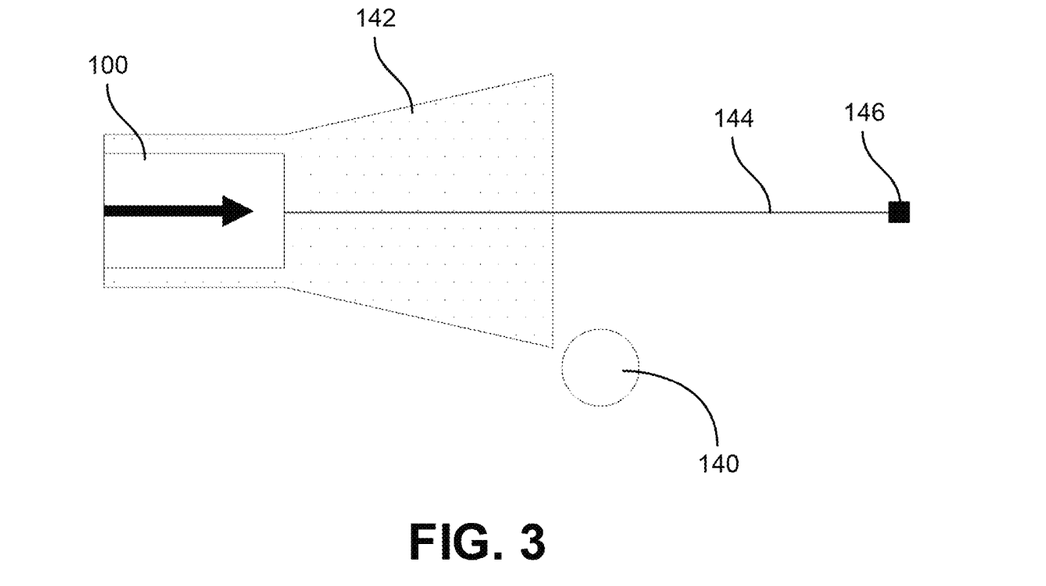
FIG. 3 shows an example of a mobile robot approaching an object.
Figure 4:
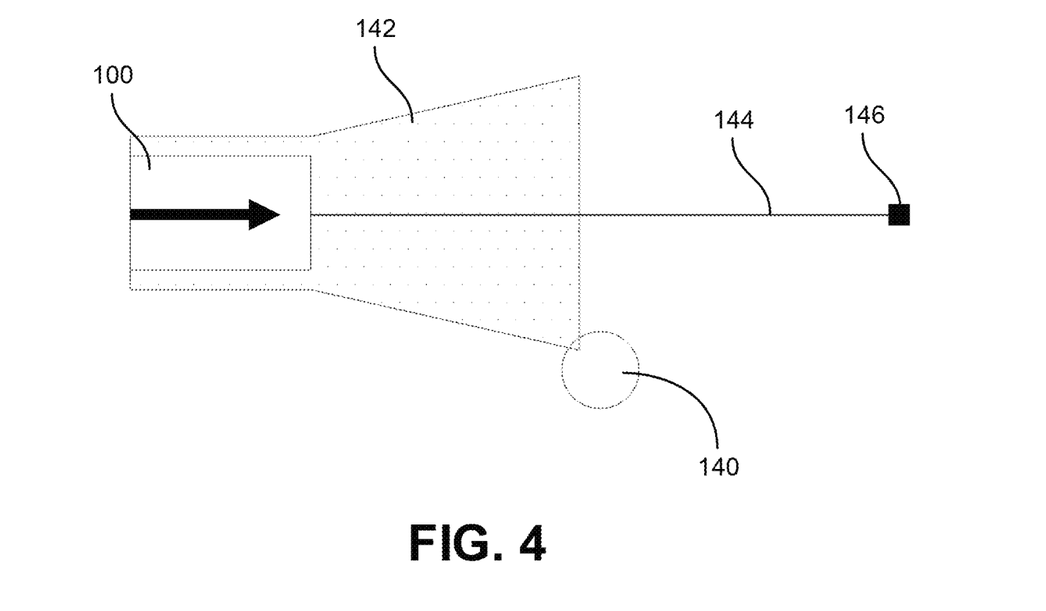
FIG. 4 shows an example of a an object triggering a safety stop for a robot.

The safety procedure can include engaging a braking system or mechanism, such as to perform emergency braking. In some cases the safety procedure can include operating one or more electric motors to stop the robot 100. The safety procedure can be configured to stop the robot as soon as practical. The safety procedure can require that the robot remain stopped for a period of time (e.g., about 1, 2, 3, 4, 5, 7, 10 seconds or any values or ranges therebetween) before the robot 100 is permitted to start moving again. When the robot 100 does start moving again, the safety procedure can cause the robot to start moving gradually before permitting the robot 100 to get back up to its normal speed (e.g., the speed from before the safety event). In some embodiments, the navigation system 130 can alter the path or route of the robot 100 (e.g., to avoid the object that triggered the safety event). In some cases, the safety event can trigger a rerouting action by the navigation system 130. The safety procedure can delay the robot 100 from reaching its destination, such as by about 3 seconds, about 5 seconds, about 7 seconds, about 10 seconds, about 12 seconds, about 15 seconds, about 20 seconds, or more, or any value or ranges therebetween, although other configurations are possible.

In some embodiments, the safety zone 142 can include a buffer area around at least a portion of the robot 100. The buffer area can be a polygon or other shape that extends beyond at least one edge of the robot 100 by a distance. For example, the distance can be about 50 mm, about 75 mm, about 100 mm, about 125 mm, about 150 mm, about 175 mm, about 200 mm, about 225 mm, about 250 mm, about 275 mm, about 300 mm, about 325 mm, about 350 mm, about 375 mm, about 400 mm, about 425 mm, about 450 mm, about 475 mm, about 500 mm, or more or any values or ranges between any of these values, although other configurations are possible. The buffer area can extend around the entire perimeter of the robot 100 in some cases, or around only part of the robot 100 in other configurations. In the examples of FIGS. 3 and 4, the buffer area covers the right and left sides of the robot. The buffer area can cover the front of the robot (e.g., overlapping a part of the forward safety zone that changes based on the robot speed. In some cases, the buffer area does not cover the front of the robot 100, because the forward safety zone already covers the front of the robot 100. In some configurations, the buffer area does not cover the back of the robot 100, such as for robots can cannot back up. Many configurations are possible. In some cases, the buffer area does not change based on the speed or velocity of the robot. The buffer area can be static, and the forward safety zone can be dynamic, as discussed herein. In some cases, if an object is identified inside the buffer area, the safety system 132 can perform the same safety procedure that can be triggered by the dynamic forward safety zone. In some embodiments, the buffer area can be omitted, or the buffer area can be configured to trigger a different safety operation than the dynamic forward safety zone.

FIG. 3 shows an example of a robot 100 moving along a path 144 toward a target location 146. The target location 146 can be a final or ending destination or one of several intermediate waypoints along the path 144. The robot 100 can move forward with a velocity (shown by the arrow). A current safety zone 142 can extend forward of the robot 100. The size of the safety zone 142 can be based at least in part on the speed of the robot 100. In FIG. 3 an object 140 is positioned generally forward of the robot 100 and outside the safety zone 142. Since the object 140 is outside the safety zone, the safety system 132 would not slow or stop the robot 100, or implement any other safety procedure. The robot 100 could then continue moving forward until it reaches the position shown in FIG. 4. FIG. 4 shows an example of the robot 100 after it has advanced closer to the object 140. Now the safety zone 142 overlaps a portion of the object 140. The safety system 132 can determine that the object 140 is located inside the safety zone 142, and can perform a safety procedure in response to that determination. For example, the robot 100 can perform emergency braking or otherwise stop.

With reference to FIG. 2, the robot 100 can include a clearance system 134, which can be configured to avoid or reduce the occurrence of safety events. The clearance system 134 can be configured to mimic the safety system 132, but in advance so that the clearance system can take proactive action to avoid triggering the safety system 132. The clearance system 134 can predict that the safety system 132 will trigger a safety event, and the robot 100 can slow down to avoid the safety event, in some cases. The clearance system 134 can use the same information (e.g., from the environment sensor 112) as the safety system 132. The clearance system 134 can take action based on identified objects that are outside of the current or active safety zone 142.

Figure 5:
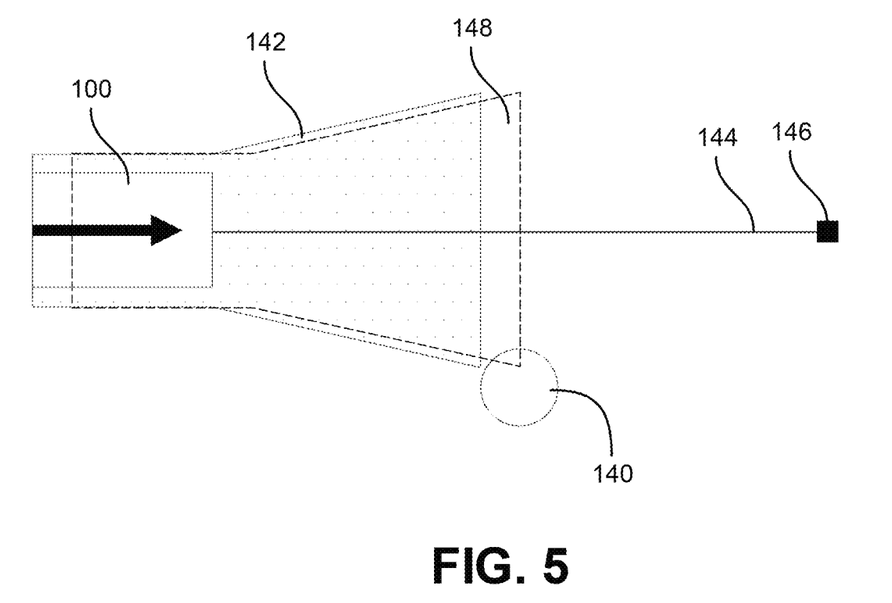
FIG. 5 shows an example of a mobile robot approaching an object.

FIGS. 5-8 show an example of the clearance system 134 being used to avoid a safety event. In FIG. 5, the robot 100 is moving along a path 144 toward a target location 146, which can be final destination or one of several intermediate waypoints along the path 144. In FIG. 5, the robot 100 is moving forward with a first velocity (e.g., at a relatively fast speed), shown by the arrow. The active or current safety zone 142 can extend forward of the robot 100, and can have a first (e.g., relatively large) size that corresponds to the first velocity. An object 140 is positioned generally forward of the robot 100 and outside the safety zone 142, similar to the example of FIG. 3. In some embodiments, the safety system 132 does not take any action because the object 140 is outside the active safety zone 142.

However, the clearance system 134 can take action to slow the velocity of the robot 100. The clearance system 134 can determine that the object will be located inside of a predicted future safety zone 148 (e.g., shown in dashed lines). The clearance system 134 can determine the location and size of the predicted future safety zone 148 based at least in part on the trajectory information (e.g., which can be stored in the memory 120). The trajectory information can include a planned path or direction of travel, and a planned speed or velocity. The position and/or orientation of the predicted future safety zone 148 can be determined based at least in part on the planned path or direction of travel, and the size of the predicted future safety zone 148 can be determined based at least in part on the planned speed or velocity. In FIG. 5, the trajectory information for the robot 100 is moving straight along the path 144 at the constant first velocity, so the predicted future safety zone can be the same size and orientation as the current safety zone 142, only shifted forward to account for the forward motion of the robot 100 at the future time associate with the predicted future safety zone 148.

Many variations are possible. For example, if the trajectory information of the robot 100 includes a turn, the predicted future safety zone can be oriented differently than the current or active safety zone. If the trajectory information includes acceleration, the predicted future safety zone can be larger than the active safety zone. If the trajectory information includes deceleration, the predicted future safety zone can be smaller than the active safety zone.

Figure 6:
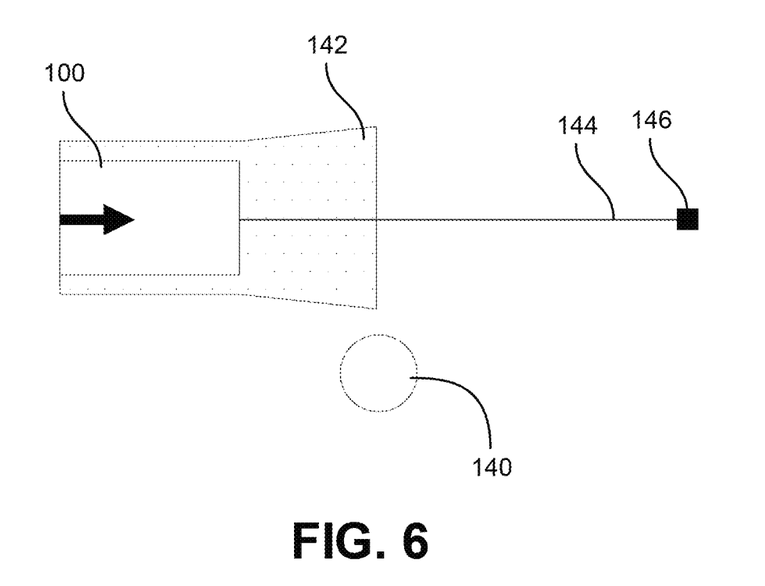
FIG. 6 shows an example of a mobile robot with reduced speed to avoid a safety stop associated with an object.
Figure 7:
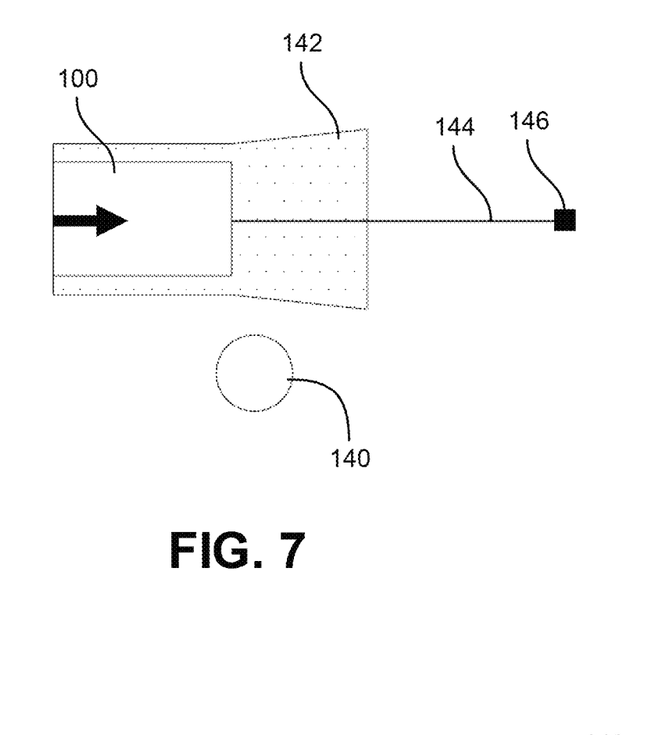
FIG. 7 shows an example of a mobile robot passing an object at a reduced speed.
Figure 8:
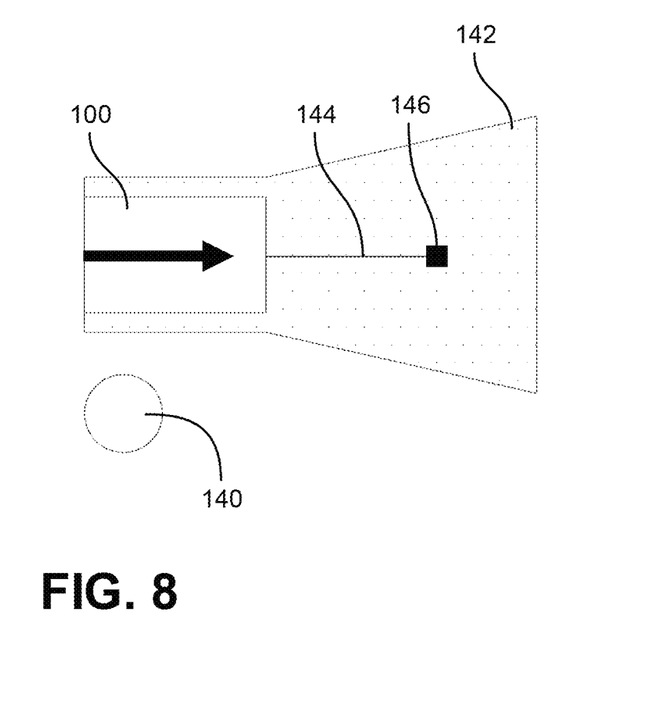
FIG. 8 shows an example of a mobile robot proceeding away from an object.

With reference to FIG. 6, in response to the determination that the object 140 is predicted to be inside of a future safety zone, the clearance system 134 can slow the robot 100 to a second (e.g., relatively slow) velocity, which is shown in FIG. 6 by an arrow. At the slower velocity, the safety zone 142 can have a smaller size than the predicted future safety zone 148, so that the object 140 remains outside the smaller safety zone 148. The trajectory information can be updated to temporarily use the second velocity. The robot 100 can proceed forward along the path 144 (e.g., without changing its path or route), but at the second or slower speed, as shown in FIG. 7. Once the robot 100 has cleared the object 140, the robot 100 can accelerate to the first or relatively fast speed, as shown in FIG. 8.

By way of example, the emergency stop example of FIGS. 3-4 can cause a delay in the robot's travel of a first amount (e.g., about 7 to 10 seconds). By comparison, the temporary slowdown that avoids the safety event, as shown in FIGS. 5-8 can cause a delay of a second amount (e.g., about 1 to 3 seconds), which can be less than the first amount of time.

In some embodiments, the clearance system 134 can cause the robot to fully stop. For example, if another robot is crossing in front of the robot 100, the clearance system 134 might cause the robot 100 to come to a stop to wait for the other robot to cross out of its path. However, the clearance system 134 can cause the robot 100 to slow and then stop more gradually than the emergency stop procedure. For example, if the clearance system 134 reduces the speed to produce a smaller safety zone so that the robot can proceed forward without triggering a safety event, the clearance system 134 can determine that even continuing at the reduced speed would trigger a safety event. So the clearance system can cause the robot to further reduce speed to avoid the safety event. This can continue as the robot continues to slow down as it approaches the object (e.g., continuing to keep the object outside the safety zone) until the robot comes to a stop. This gradual stopping can reduce wear and tear on the robot and can improve stability, as compared to emergency braking. Also, the robot 100 would be permitted to start moving again at any time, since it would not need to remain still for a period of time that may be mandated in the case of an emergency safety stop.

Figure 9:
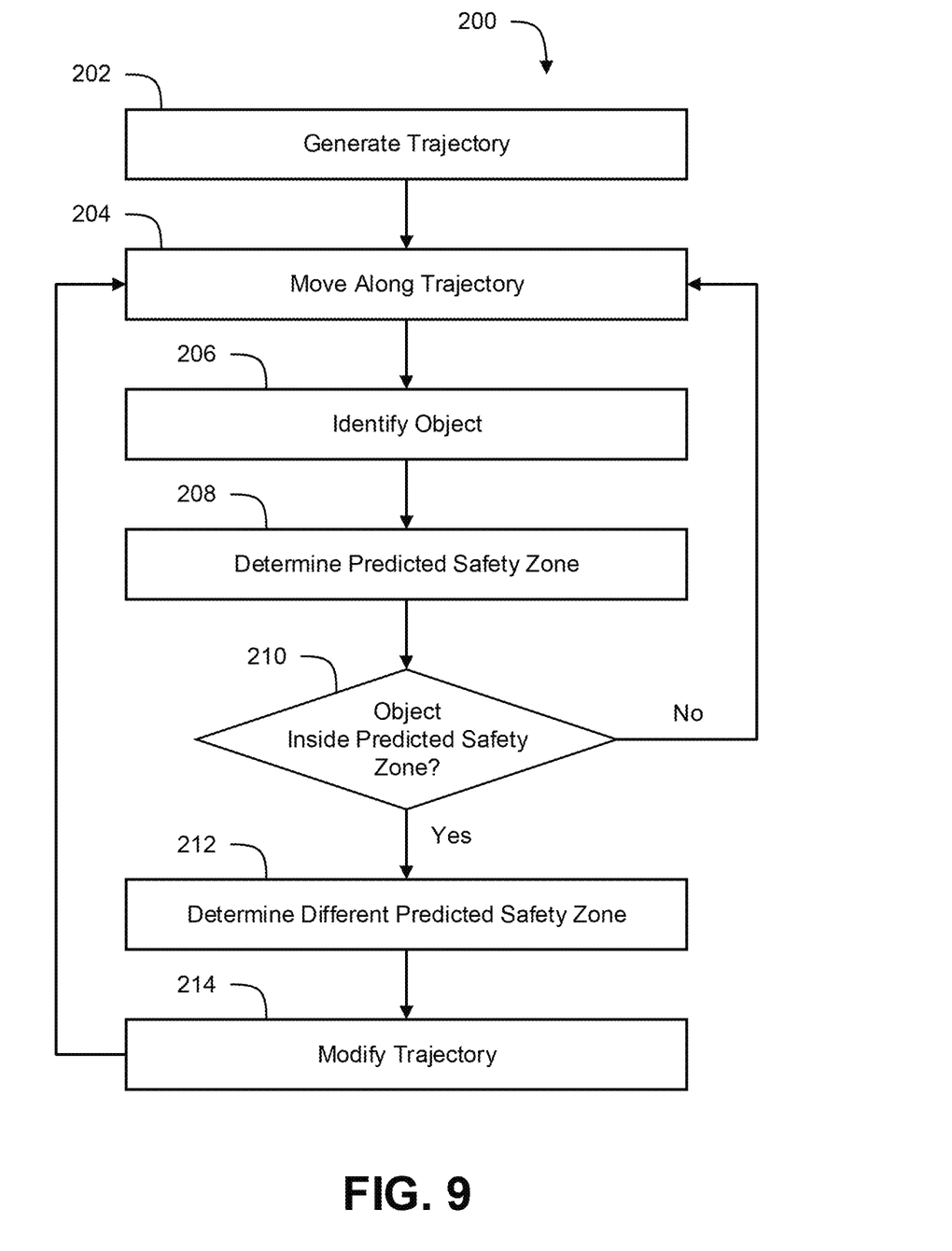
FIG. 9 is a flowchart of an example method for avoiding safety events.

FIG. 9 shows a flowchart of an example embodiment of a method 200 for avoiding safety events. The method 200 can start to block 202 by generating trajectory information. For example, the navigation system 130 can determine a path or route, such as using a location (e.g., a starting or current location of the robot), a target location (e.g., an ending destination or intermediate waypoint), and a mapping of the environment, which information can be received via the communication interface 122 from an external system, or can be received from a user via the user interface 124. In some cases, the robot can store a mapping of the environment. The navigation system 130 can determine one or more speeds for the robot 100 along the route. In some cases velocities can be selected to balance smooth driving and short travel times. The trajectory information can include multiple waypoints or multiple path portions, which can have different directions and/or different speeds. In some cases, the trajectory information (e.g., route information and/or speed information) can be received from an external source. The trajectory information can be determined at any suitable time, such as dynamically as the robot moves from a starting location to a target location.

At block 204, the robot 100 can move according to the trajectory information. For example, the robot 100 can move along the determined path at the determined speed. At block 206, the robot can identify and object, such as using the environment sensor 112. For example, a laser scanner on the robot 100 can emit a laser pulse that is at least partially reflected back to a detector on the robot 100. The presence and/or location of the object can be determined, such as by the direction of the emitted laser pulse and the time that the reflected light was received.

Although not shown in FIG. 9, in some embodiments, the robot 100 can determine whether the object is located inside of the currently active safety zone (e.g., using the safety system 130). The active safety zone can be determined using the current location of the robot 100 and the current speed of the robot 100. If the object is located inside of the currently active safety zone, the robot 100 can perform an emergency stop, as discussed herein. If the object is not located inside of the currently active safety zone, the method can proceed to block 208.

At block 208, the robot can determine a predicted future safety zone (e.g., similar to the example of FIG. 5). The predicted safety zone can be determined using the trajectory information. The predicted safety zone can be determined based on the predicted location of the robot 100 at a future time and the planned speed at that future time. The predicted location can be known or determined from planned path of the robot and the planned speed of travel along that planned path. At block 210 the location of the object can be compared to the predicted safety zone. If the object is not located inside of the predicted safety zone, the method can return to block 204, and the robot can continue moving according to the trajectory information. In some embodiments, the robot can repeatedly to check whether the object will be inside of a predicted safety zone. For example, if the object moves, its new location can be identified and compared to a predicted safety zone (e.g., during a next round of an iterative clearance process). The trajectory information (e.g., location and/or speed) at any point along the robot's path can be used at block 208 to determine a predicted safety zone, including the initial starting point of the robot.

If the object is determined to be inside of the predicted safety zone, the method can proceed to block 212, and a different feasible future safety zone can be determined that would avoid the object. For example, if the object would overlap with a first predicted safety zone that is associated with a first speed (e.g., a relatively fast speed yielding a relatively large predicted safety zone), a second future safety zone can be determined that is associated with a second speed (e.g., a relatively slow speed that yields a relatively small safety zone) so that the object remains outside of the second safety zone. In some implementations, the size of the different safety zone can be selected to be as large as possible, while avoiding the object. In some implementations, the size of the different safety zone can be configured to provide a defined buffer distance between the different safety zone and the object. In some cases, the buffer distance can be a user defined or user adjustable parameter (e.g., using the user interface).

At block 214, the trajectory information can be modified, so that the robot slows down to the speed associated with the identified different safety zone. The method can return to block 204, and the robot 100 can continue moving, but can use the modified trajectory so that the robot 100 avoids the safety event that would have occurred if the robot had continued using the previous trajectory information.

In some embodiments, block 212 can be omitted. For example, when the robot determines that an object would be inside of a predicted safety zone, the robot 100 can respond by changing the trajectory (e.g., at block 214), such as by slowing down the robot 100. The method can loop back to block 204 and the robot can continue along but using the new trajectory. The new trajectory information can be used to determine a new predicted safety zone at block 208, and the method can check whether the object would be inside of the new predicted safety zone at block 210. If the object is determined to still be within the new predicted safety zone, the trajectory of the robot 100 can be modified further at block 214, and the process can repeat until the object is no longer in the predicted safety zone. Accordingly, the robot 100 can make incremental changes to the trajectory information until the trajectory information has been changed sufficiently to avoid a safety event for the object. The incremental amount of change for the trajectory can be predetermined, adjustable by the user (e.g., using a user interface), and/or can depend on the speed or other parameters of the robot and/or current trajectory.

In some embodiments, a plurality of predicted future safety zones can be determined at block 208, such as for a plurality of future times and/or for a plurality of future locations of the robot 100. The plurality of predicted future safety zones can be compared to the location of the object at block 210. If the object is not inside any of the predicted future safety zones, the robot can continue moving without modifying the trajectory information. If the object is inside one or more of the predicted safety zones, the speed of the robot can be reduced at an appropriate time to avoid the safety event. By way of example, the robot 100 can be configured to determine predicted safety zones for increments of time and/or for increments of distance. The object may not be within the predicted safety zone for 0.5 seconds in the future, but it may be within the predicted safety zone for 1.0 seconds in the future. In some cases, the robot can start slowing without delay, even though there are one or more future predicted safety zones that are clear of the object, which can facilitate smooth braking. The deceleration can be more smoother or more gradual the further out the potential safety event is identified. In some embodiments, the method can identify multiple objects and can analyze whether any of the multiple objects are within the one or more predicted future safety zones.

In many instances, the path of travel for the robot can remain the same, and a safety event can be avoided by slowing the robot (e.g., as described in connection with FIGS. 5-8). In some cases, the path of travel for the robot can be modified so that the robot 100 can avoid a safety event for the object. In some cases, the clearance system 134 can provide a notification to the navigation system 130 when the clearance system 134 makes an adjustment to the trajectory (e.g., speed) of the robot. The navigation system 130 can then consider whether to make a change in the robot's route. In some cases, the navigation system 130 can be operating in parallel with the clearance system 134, such as to repeatedly evaluate whether to change the robot's route. The notification from the clearance system 134 can be one factor that the navigation system 130 considers when deciding whether to change the route.

In some embodiments, the safety system 132, the clearance system 134, and the navigation system 130 (e.g., or any two thereof) can operate in parallel, such as using the same input information (e.g., from the environment sensor 112). The safety system 132 can be analyzing the input information to determine whether to implement a safety stop. The navigation system 130 can be analyzing the input information to determine whether to change the route of the robot 100. The clearance system 134 can be analyzing the input information to determine whether to slow the robot 100 down to avoid a safety event. The clearance system 134 can be configured to avoid safety events, but the safety system 132 can continue to run in parallel as a backup, for example in case an object moves into the active safety zone without previously triggering any of the predicted safety zones. In some embodiments, the clearance system 134 can be implemented as part of the navigation system 130. The safety system 132 can be safety rated. In some embodiments, the safety system 132 can be hardware-based (e.g., without a software component), which can facilitate the safety rating of the safety system 132. In some embodiments, the safety system 132 has a software module that is relatively simple compared to the clearance system 134. The clearance system 134 can be a separate software module from the safety system 132, so that the clearance system 134 can have more complex operations without being safety rated.

In some embodiments, the size of the safety zone can be adjustable based on user input (e.g., via the user interface 124). The user can designate larger or smaller safety zones depending on how cautious the user wants the robot to be, or how aggressive the user wants the safety system to be. If the safety system 132 is set to use relatively large safety zones, the clearance system 134 can use corresponding relatively large predicted safety zones. If the safety system 132 is set to use relatively small safety zones, the clearance system 134 can use corresponding relatively small predicted safety zones. The clearance system 134 can determine the predicted safety zones based at least in part on the adjustable safety zone size used by the safety system. The clearance system can be configured to anticipate the predicted future actions of the safety system. The clearance system can then take action (e.g., slow the robot) to prevent the safety system from taking action.

Additional Information

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The following is claimed:

1. A mobile robot comprising:
    a drive system configured to move the mobile robot;
    an environmental sensor configured to identify one or more objects in an environment around the mobile robot;
    a safety stop system configured to:
        determine a safety zone, wherein the size of the safety zone is based at least in part on a velocity of the mobile robot;
        determine whether an object identified by the environmental sensor is in the safety zone; and
        engage emergency braking to stop the mobile robot in response to a determination that an object is in the safety zone; and
    a safety stop avoidance system configured to:
        access trajectory information for a planned path of travel for the mobile robot;
        identify an object that is outside a current safety zone;
        determine based at least in part on the trajectory information that the object will be inside a predicted future safety zone that would trigger a safety stop event; and
        control the drive system to slow the mobile robot to reduce the size of the safety zone to avoid the safety stop event.

2. The mobile robot of claim 1, wherein the safety stop system is hardware-based, and wherein the safety stop avoidance system is software-based.

3. The mobile robot of claim 1, wherein the size of the safety zone is based at least in part on a user-adjustable parameter, and wherein a size of the predicted future safety zone is also based at least in part on the user-adjustable parameter.

4. The mobile robot of claim 1, further comprising a navigation system, wherein the safety stop system, the safety stop avoidance system, and the navigation system operate in parallel as separate modules.

5. The mobile robot of claim 1, further comprising a navigation system that is configured to modify the planned trajectory of travel for the mobile robot based at least in part on a notification that the safety stop avoidance system slowed the mobile robot.

6. A mobile robot comprising:
    a drive system configured to move the mobile robot;
    a sensor configured to identify one or more objects near the mobile robot;
    a safety system configured to stop the mobile robot when an object is detected inside of a safety zone, wherein the size of the safety zone is based at least in part on a velocity of the mobile robot;
    a clearance system configured to:
        identify an object using the sensor;
        access trajectory information for a planned path of travel for the mobile robot;
        determine a first future safety zone based at least in part on the trajectory information that includes a first velocity, wherein the first future safety zone has a first size that corresponds to the first velocity;
        determine that the object is inside the first future safety zone;
        determine a second future safety zone that has a second size that corresponds to a second velocity, wherein the second size is smaller than the first size so that the object is outside the second future safety zone; and
        modify the trajectory information to use the second velocity.

7. The mobile robot of claim 6, wherein the second velocity is slower than the first velocity.

8. The mobile robot of claim 6, wherein the sensor comprises a laser scanner.

9. The mobile robot of claim 6, wherein the clearance system is configured to determine the first future safety zone to have the same first size that the safety zone has for the first velocity.

10. The mobile robot of claim 6, wherein the safety system and the clearance system operate in parallel at the same time.

11. A mobile robot comprising:
    a drive system configured to move the mobile robot;
    an environmental sensor configured to identify one or more objects in an environment around the mobile robot;
    a safety system configured to perform a safety stop when an object is detected inside of an active safety zone of the robot;
    a navigation system configured to:
        generate trajectory information based on a location, a target location, and one or more objects located in the environment, wherein the trajectory information includes a route from the location to the target location and one or more velocities along the route;
        determine one or more predicted safety zones based on the trajectory information;
        determine that an identified object would be inside one of the one or more predicted safety zones; and
        adjust the trajectory information to produce modified trajectory information for which the identified object is outside the one or more predicted safety zones.

12. The mobile robot of claim 11, wherein a size of the safety zone is based at least in part on a velocity of the mobile robot.

13. The mobile robot of claim 12, wherein the navigation system is configured to adjust the trajectory information by slowing the velocity of the mobile robot.

14. The mobile robot of claim 11, wherein the navigation system is configured to adjust the trajectory information by changing a route of the mobile robot.

15. The mobile robot of claim 11, wherein the navigation system is configured to determine a plurality of predicted safety zones based on the trajectory information, and to compare a location of the object to the plurality of predicted safety zones.

16. A robot comprising:
    a safety system configured to detect a safety event and take a safety action in response to the detected safety event; and a clearance system configured to predict a future safety event and take action to avoid the predicted future safety event.

17. The robot of claim 16, wherein the safety system is configured to stop the robot when an object is identified inside of a safety zone.

18. The robot of claim 17, wherein the clearance system is configured to slow the robot when an object is identified outside of the safety zone and inside of a predicted future safety zone.

19. The robot of claim 18, wherein a size of the safety zone and a size of the predicted future safety zone change based at least in part on a speed of the robot.

20. The robot of claim 19, wherein the clearance system is configured to determine a reduced speed for which the object remains outside the safety zone and to slow the robot to the reduced speed.

* * * * *